(12) United States Patent
Lacaze et al.

(10) Patent No.: US 11,544,951 B2
(45) Date of Patent: Jan. 3, 2023

(54) AUTONOMOUS DELIVERY VEHICLE

(71) Applicant: Robotic Research, LLC, Gaithersburg, MD (US)

(72) Inventors: Alberto Daniel Lacaze, Potomac, MD (US); Karl Nicholas Murphy, Rockville, MD (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 601 days.

(21) Appl. No.: 16/527,199

(22) Filed: Jul. 31, 2019

(65) Prior Publication Data

US 2021/0034847 A1 Feb. 4, 2021

(51) Int. Cl.
*G06V 40/10* (2022.01)
*G06Q 10/08* (2012.01)
*G05D 1/02* (2020.01)

(52) U.S. Cl.
CPC ............ *G06V 40/10* (2022.01); *G05D 1/021* (2013.01); *G06Q 10/083* (2013.01)

(58) Field of Classification Search
CPC ....... G06V 40/10; G05D 1/021; G06Q 10/083
USPC .......................................................... 382/103
See application file for complete search history.

(56) References Cited

U.S. PATENT DOCUMENTS

| | | | |
|---|---|---|---|
| 9,256,852 B1 * | 2/2016 | Myllymaki | G06Q 10/083 |
| 10,650,621 B1 * | 5/2020 | King | H04L 67/12 |
| 2016/0235236 A1 * | 8/2016 | Byers | A47G 29/14 |
| 2018/0203364 A1 | 7/2018 | Streefkerk | |
| 2019/0228375 A1 * | 7/2019 | Laury | G05D 1/0088 |

* cited by examiner

*Primary Examiner* — Gabriel I Garcia
(74) *Attorney, Agent, or Firm* — RowanTree Law Group, PLLC; Carson C. K. Fincham

(57) ABSTRACT

Postal, package, and grocery deliveries are performed routinely everywhere around the world. Currently, the delivery truck drives slowly, and the postman or delivery man goes from one house to another. The postman already has a box that he carries with the sorted letters for a few of the contiguous houses, stops the truck, and walks to the different houses in the bunch, and then moves the truck and goes to the next bunch of houses. In this invention, the package delivery truck will automatically follow the mailman while still staying close to the curb to minimize traffic issues. Here, the autonomous package or delivery truck could actually go in front of the mailman to look for a good spot for the next cluster, or can wait for the mailman that is close to the last house of the current cluster, pick him up, and drop off at the center of the next cluster, or at the first house of the next cluster. In addition, there are robots that replace the function of the human (mailman or grocery delivery man).

9 Claims, 8 Drawing Sheets

Basic System

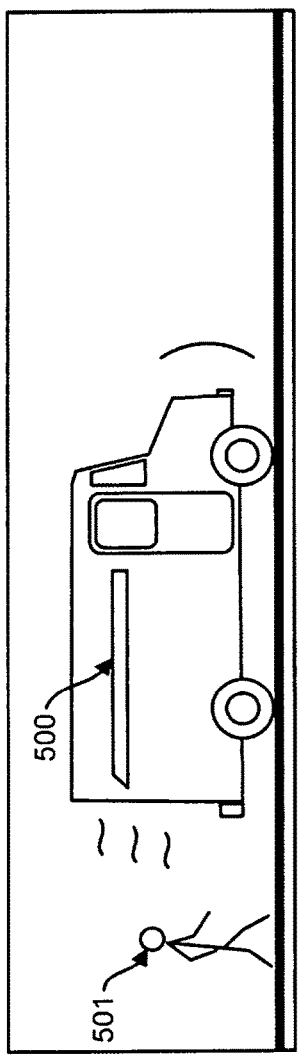
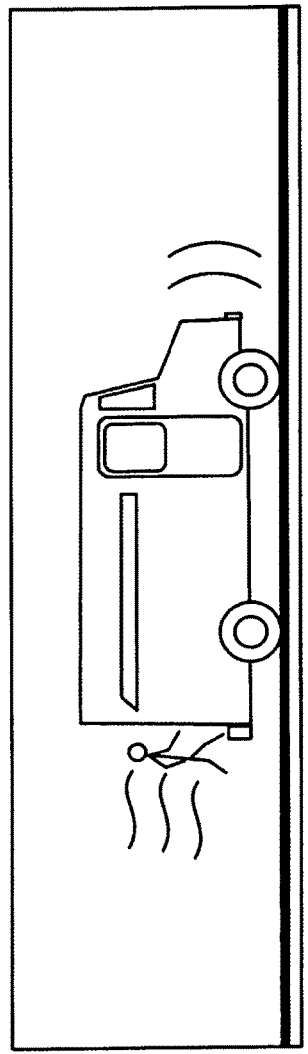
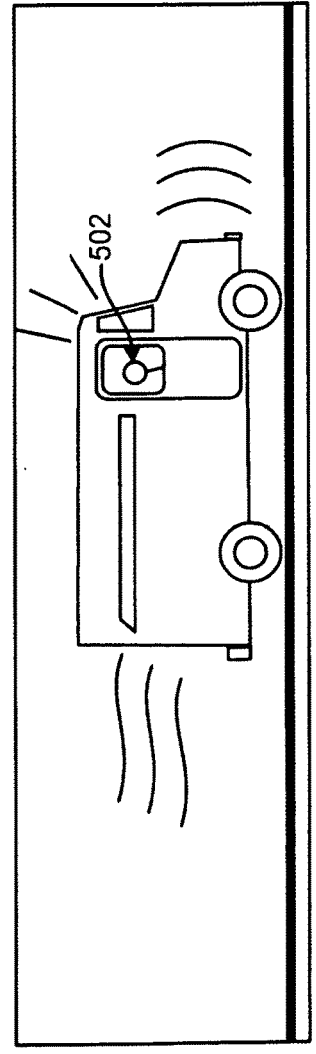

AUTONOMOUS DELIVERY VEHICLE

CROSS-REFERENCES TO RELATED APPLICATIONS

None.

BACKGROUND

1. Field of the Invention

The invention being presented here involves the autonomous package delivery truck that automatically follows the mailman while still staying close to the curb to minimize traffic issues. In this case, the truck could actually go in front of the mailman to look for a good spot for the next cluster, or can wait for the mailman that is close to the last house of the current cluster, pick him up, and drop off at the center of the next cluster, or at the first house of the next cluster. In addition, robots replace the function of the mailman or the grocery delivery man.

2. Description of Related Art

The statements in this section merely provide background information related to the present disclosure and may not constitute prior art.

The exponential growth in human population, coupled with improved standards of living, has created new challenges in the area of collection and delivery services. Parcel carriers are called upon to expeditiously collect and deliver an ever-increasing number of packages to customers. Fuel delivery trucks must travel through urbanized areas that are becoming increasingly crowded. Likewise, prevailing trends in consumable item packaging have resulted in a significant increase in the amount of waste generation. Accordingly, it has been necessary to develop new technologies which provide for efficient management of collection and delivery services such as parcel collection, fuel delivery, waste removal, and recycling. In order to ensure a sustainable human population, it is important to implement collection and delivery activities in such a manner that they provide a net benefit to the population.

The delivery of physical items to a customer's specified location is traditionally accomplished using a delivery system including a human controlled truck, bicycle, cart, etc. The item may be picked up by a human agent from a materials handling facility, packed and shipped to the customer's residence or place of business by a shipping carrier such as United States Postal Service, FedEx, or UPS. An agent of the shipping carrier loads the items into the truck that is driven to the final destination and a driver, or another human companion accompanying the driver will retrieve the item from the truck and complete the delivery to the destination. Over time, there is an increasing frequency and volume of deliveries of items from e-commerce and mail-order companies that has resulted in an increased need for faster and more efficient delivery methods.

There have been no reports in the patent literature on the automation of the function of the driver of the postal, package, or grocery delivery truck in combination with robots being used to deliver the mail or the groceries. Current systems are designed to have the driver of the truck and the control mechanism to make sure that the truck minimizes the work performed by the humans picking up the bins and this process can be readily and economically performed using current technology.

There has been an autonomous unmanned road vehicle that has been developed for making deliveries. It operates autonomously on paved roadways and has a control system for autonomous driving and a perception system for detecting objects in its surroundings. It also has one or more cargo compartments for carrying the delivery items. Since the vehicle does not carry any passengers, the size and motor power of the vehicle can be reduced compared to conventional passenger-based vehicles. This invention is disclosed in US Patent Application No. 20180203364A1.

There has been a smart postal box that has been developed in support of autonomous delivery nodes. A controller determines a particular compartment of a smart postal box in which a package is to be delivered. In addition, the controller provides the authorized entity access to the particular components by aligning rolling doors of the smart postal box with the particular compartment. This invention is disclosed in the following US Patent Application: US Application No. 20160235236A1.

There has been an autonomous delivery platform that has been developed in U.S. Pat. No. 9,256,852. There has been a sensor-based control that has been developed for an autonomous delivery vehicle that conveys intelligent driving that considers the individual characteristics of the cargo that needs to be transported and a method for operating an autonomous mining truck. This has been disclosed in DE102008030546A1.

There have been methods developed for delivering to multiple locations by using autonomous vehicles. The method of delivery occurs in two stages. First, a vehicle transports the parcel to a transfer point with address information from a shipping party. The first vehicle is designed for operation on the public road system. The parcel is then transferred to a secondary vehicle for delivery to the final point. The second vehicle is autonomous and adapted to use off of public roads or in smaller spaces. It relies on information provided by the recipient or the location controller of the area for the second delivery segment. This method has several advantages such as efficiency, security, and late provision of final destination information.

Again, it is worth noting that there are no reports of a control mechanism that has been developed that automates the functions of the driver of the postal, package, and grocery delivery truck that is found in the patent literature.

SUMMARY OF THE INVENTION

The invention that is being presented here involves automating the functions of the driver of the postal, package, and grocery delivery truck as well as using robots to replace the functions of the mailman and grocery delivery man.

It involves the postal, package, and grocery delivery truck automatically following the mailman while still staying close to the curb to minimize traffic issues. In this case, the autonomous package or grocery delivery truck could actually go in front of the mailman to look for a good spot for the next cluster, or can wait for the mailman that is close to the last house of the current cluster, pick him up, and drop off at the center of the next cluster, or at the first house of the next cluster.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

The truck can vary its speed depending on if the human helper is walking around the truck as shown in FIG. 5A, riding on the truck as shown on FIG. 5B, or riding inside the cab as shown on FIG. 5C.

Figure 6A:
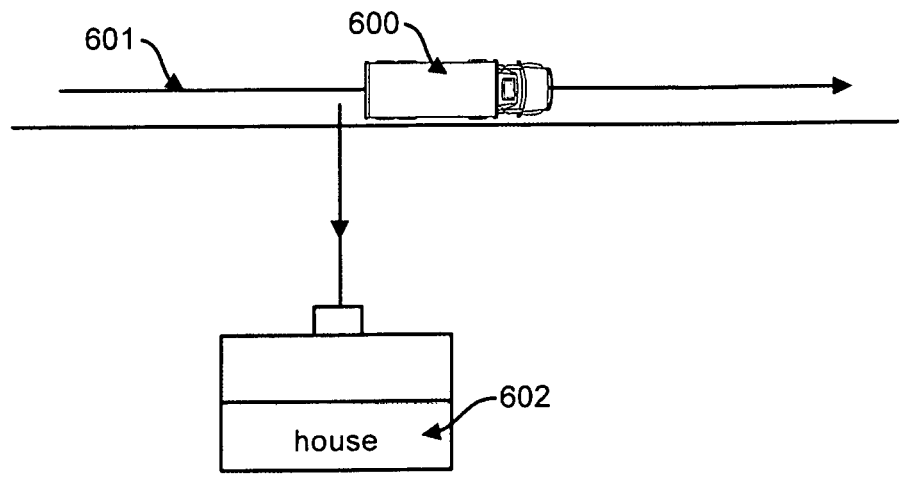
Figure 6B:
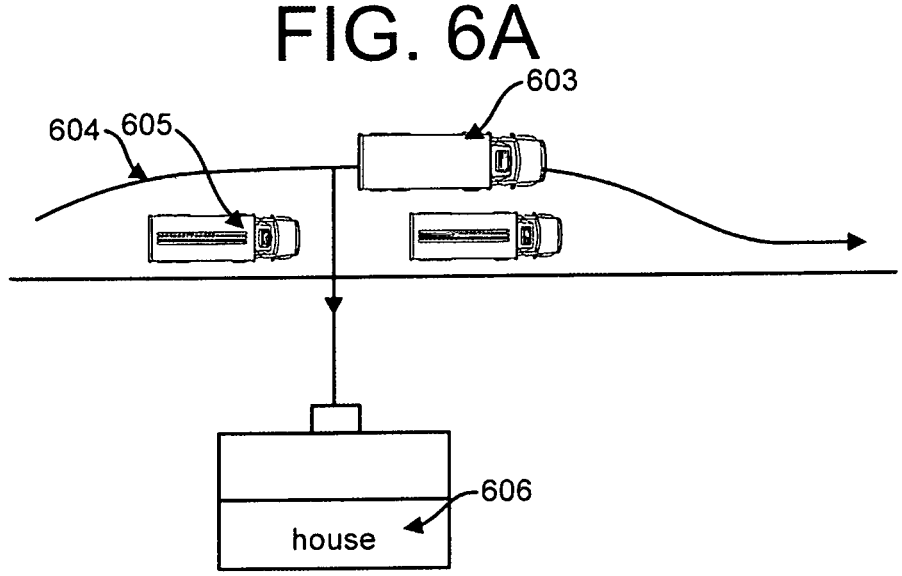
Figure 6C:
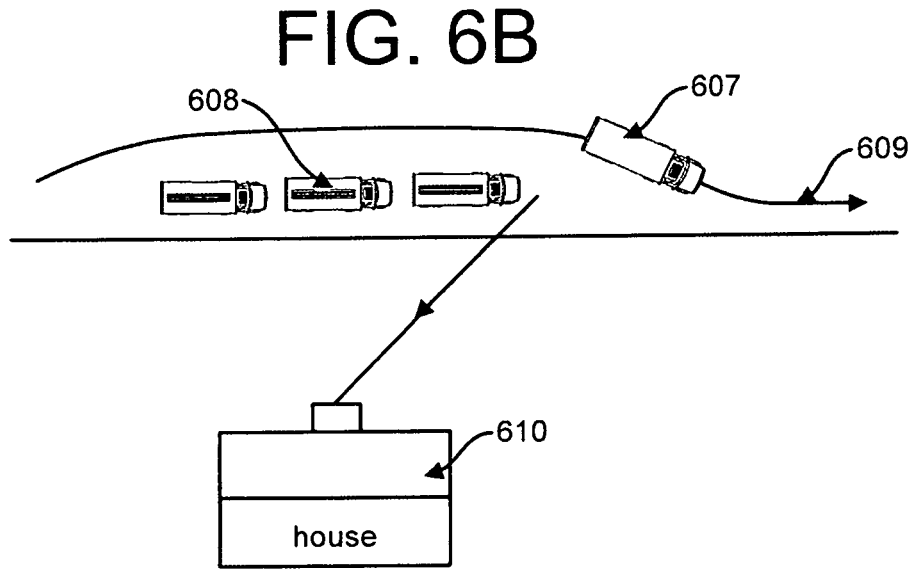

FIG. 6A—without obstacles, the truck stops near the curb and near the delivery location to minimize the time to carry the package to the drop-off location. FIG. 6B—Parked cars and other obstacles can result in modified paths. FIG. 6C—Parked cars and other obstacles can result in modified paths and/or stopping locations.

Figure 7:
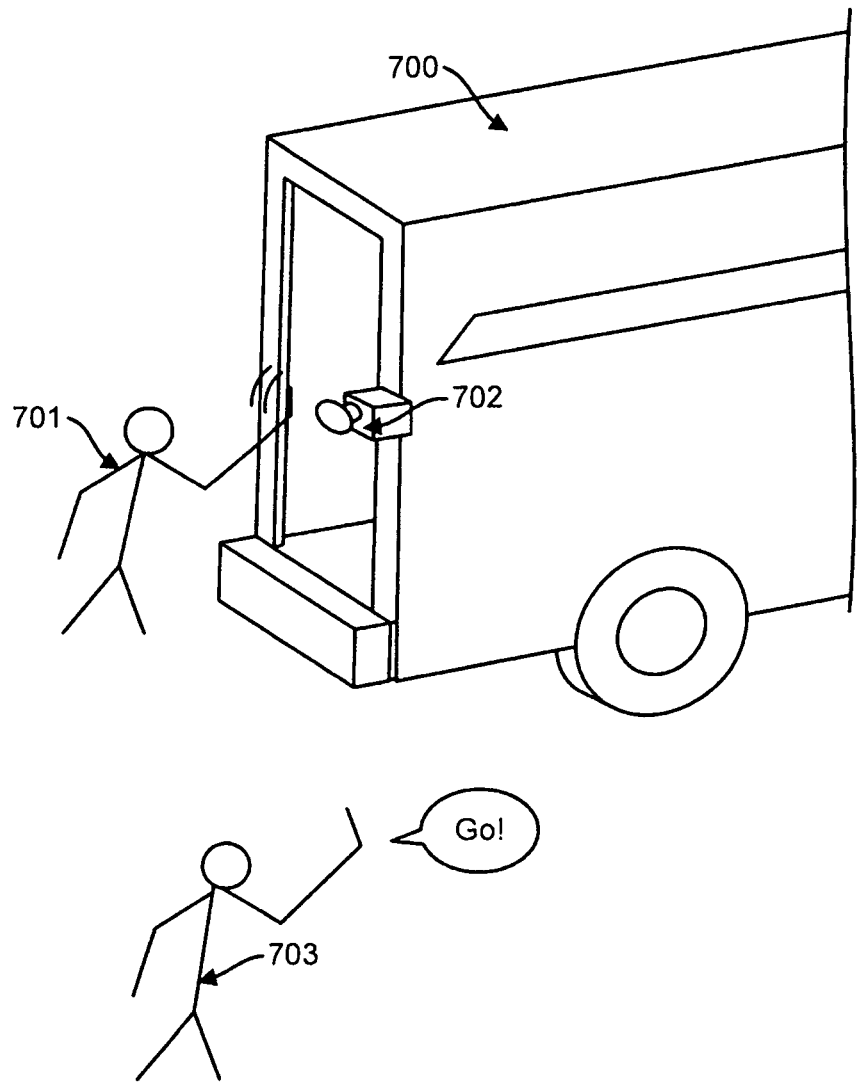

FIG. 7—The truck can monitor the workers to determine when they are finished unloading items and the truck can move to the next stop location. The humans may also signal the truck by pressing a switch, using hand signals, giving voice commands, or some combination of the two types of commands. The commands could be for the truck to go onto the next location or for it to wait at the current location.

Figure 8:
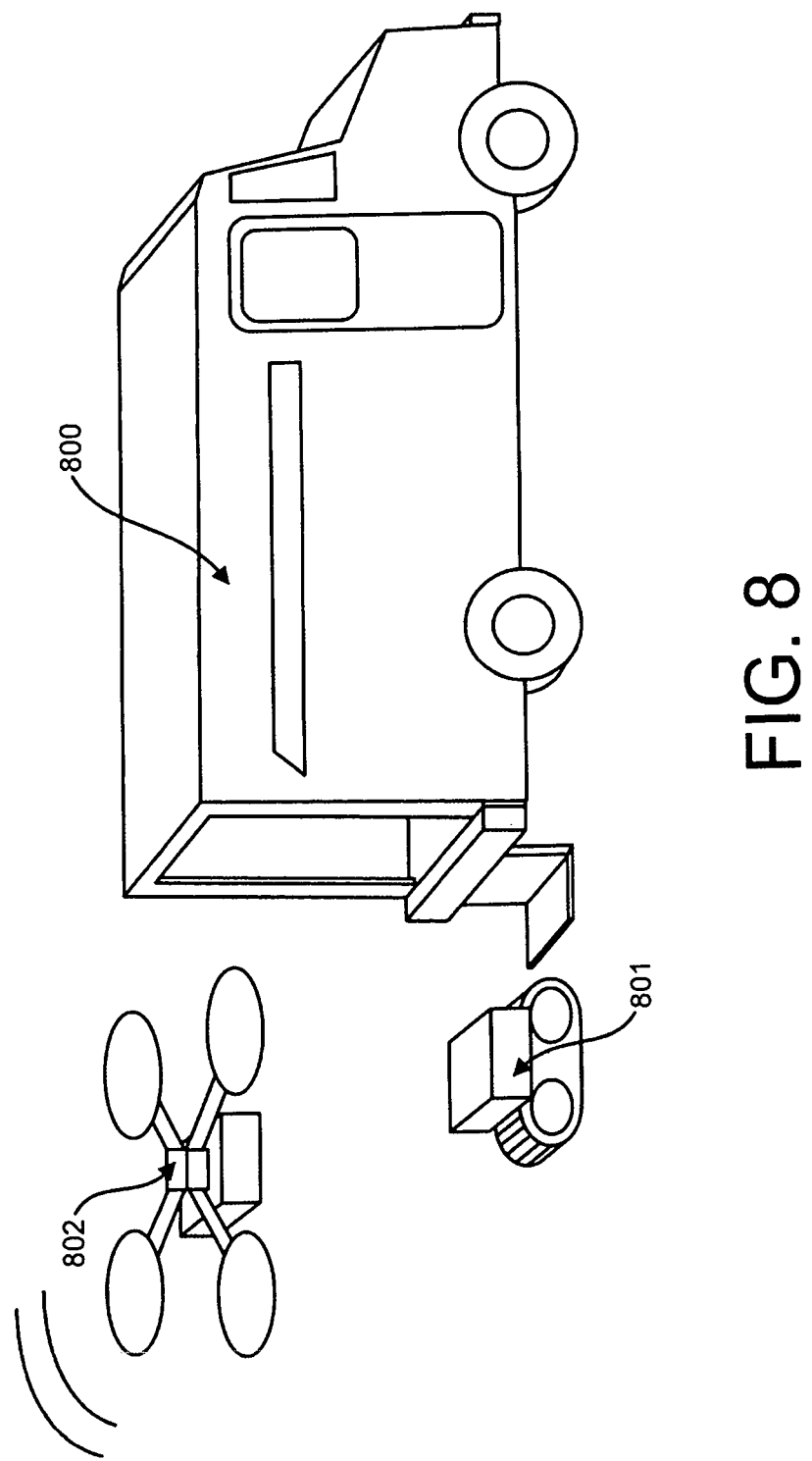

FIG. 8—Small robotic systems can replace the humans and deliver the items to the drop-off location. Special docking devices may be employed to load packages or recover the small robots.

DETAILED DESCRIPTION OF THE INVENTION

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth herein, the terms "a," "an," and "the" are not limited to one element, but instead should be read as meaning "at least one." The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

Mail, package, and grocery deliveries are performed at regular intervals around the world. The process currently is performed by a team consisting of a garbage truck that carries the refuse that is driven around urban areas at slow speeds. This garbage truck usually contains a large opening in the back. A team of humans controls this truck and collects the bins dumping the refuse on the back of the truck and returning the bins to the curb.

Usually, the driver (human) of the truck positions the truck so as to minimize the distance that the mailmen or grocery delivery men need to walk with the mail or the groceries, and slowly drives a route that take the truck to the collections sites.

However, the driver of the truck and the control mechanism to make sure that the truck minimizes the work performed by the humans delivering the mail or the groceries can be readily and economically performed using current technology.

The invention being presented here automates the functions of the driver of the mail or grocery delivery truck. It involves a mail or grocery delivery truck designed to follow routes to deliver mail or groceries using a human to walk to the mail reception container/location comprising an autonomous truck that includes a drive-by-wire kit, a database storing the collection routes, a mechanism for detecting the position of the human which picks up the mail/packages from the truck and walks them to the rail receptacle (mailbox or otherwise) and a control mechanism that follows the assigned route and speeds or slows down the truck as to minimize the distance that the human will need to walk to pick up the mail/packages from the truck and drop them off at the mailbox.

A drive-by-wire kit is the use of electrical or electro-mechanical systems for performing vehicle functions that are traditionally achieved by mechanical linkages. This technology replaces the traditional mechanical control systems that have electronic control systems using electromechanical actuators and human-machine interfaces such as pedal and steering feel emulators. Many components such as the steering column, intermediate shafts, pumps, hoses, belts, coolers and vacuum servos as well as master cylinders are eliminated from the vehicle.

The autonomous package delivery system has a control system that takes under consideration the location of 2 or and more humans delivering the mail. It also controls the speed so that the distances are minimized, taking under consideration that when the human is travelling from the truck to the mailbox, the packages may be heavy, while the delivery person returns to the truck, he/she may not be carrying a load, the distances are weighted differently for "full" and "empty" bins.

The autonomous package delivery system is also equipped with a mailbox/mail receptacle detector, or alternatively it remembers the location of the previous delivery. The autonomous package delivery trucks automatically stops to align the cargo door of the truck (with possibly some extra clearance) with the detected mailboxes.

The autonomous package delivery trucks are equipped with sensors that detect if an obstacle is on the route and a controller that automatically stops if the a-priori routes are blocked. The controller is aware of the rules of the road and the truck automatically obeys the rules of the road. The location of the mailman (human/s) are sensed using GPS or ranging radios or LADAR or stereo vision or via EO or IR camera.

GPS refers to the global positioning system and is a satellite-based navigation system made up of at least 24 satellites. It works in any weather conditions, anywhere in the world, 24 hours a day. It was originally put into orbit for military use but were available for civilian use from the 1980s.

Ranging radios are a system of radio transmitting stations, each of which transmits a signal that not only carries identification but also intrinsic value to navigator in fixing his position.

LADAR refers to Light Detection and Ranging and it is also referred to as LIDAR. It is a surveying method that measures distance to a target by illuminating the target with pulsed laser light and measuring the reflected pulsed with a sensor. The differences in laser return times and wavelengths are used to make 3-D representations of the target that is desired to examine.

Stereo vision refers to the perception of the depth and the three-dimensional structure obtained on the basis of visual information deriving from two eyes by individuals with normally developed binocular vision.

EO camera stands for electro-optical sensor and they are electronic detectors that convert light, or a change in the light, into an electronic signal. They are used in many industrial and consumer applications such as lamps that turn on automatically in response to darkness, position sensors that activate when an object interrupts a light beam, flash detection to synchronize one photography flash to another, and photoelectric sensors that can detect the distance, absence, or presence of an object.

IR camera stands for infrared camera and are non-contact devices that detect infrared energy (heat) and converts it into an electronic signal, which is then processed to produce a thermal image on a video monitor and perform temperature calculations. They operate in wavelengths as long as 14,000 nm.

The control system of the autonomous package delivery system advises the human to get into or out of the truck at the end or beginning of the route. Only houses/businesses with packages in the truck are included in the route and the control system signals to the human to which locations the packages need to be dropped off at.

The control system from the autonomous package delivery system takes under consideration if the human may be sorting mail in the truck while in motion and control speeds and acceleration rates accordingly. The autonomous package delivery truck waits longer at locations that have more deliveries or where the human must make multiple trips to carry the packages.

The human uses an interface (switch/verbal/hand gesture) to indicate to the controller in the truck to move to the next location. The controller in the truck automatically avoids stationary obstacles on the route. The controller in the autonomous package delivery truck has some freedom to adjust the side separation with respect to the route of the truck depending on if the vehicles are parked on the road. If there are no vehicles parked on the road, then the controller will drive the route close to the curb. If there are vehicles parked by the side of the road, the controller will drive the truck with sufficient space for safety and taking under consideration that the human (and bin) will need to walk between the truck and the parked car.

The controller of the autonomous package delivery system takes under consideration that parked cars on the side of the road may create a barrier that does not allow the human with the packages to traverse, and positions the truck in areas where there is sufficient space for the human to cross from the road to the curb. The human has an interface that can command the truck to automatically move forwards or backwards along the route.

The autonomous package delivery truck has different openings for different types of packages and the truck will control its position along the route taking under consideration the delivery type and the relative position of the opening in the truck for that type of package.

The autonomous package delivery truck has robotic systems that replace the humans delivering the mail/packages. These robotic systems load the package, un-dock from the truck, take them to the delivery location, deliver the mail/package, return to the truck and dock.

The marsupial robots do not dock in between deliveries and only when the battery is low, or when they need to get new packages. The marsupial robots are larger robots that are capable of carrying smaller robots. The larger robot is like the "mother" robot and the smaller robots are like the "son" robots. They also follow the same phenomenon in nature by living beings such as kangaroos. The marsupial relationship allows a team of robots to have several advantages such as robustness, faster accomplishment of tasks, and higher quality of the results. There can be different kinds of marsupial robots that can be used depending on the package type, or load type.

The robots or the human not only deliver mail, but also collect mail from the location.

The autonomous package delivery truck has a detector that can determine if the location has mail/packages to be picked up such as the presence of the red flag up by the side of the mailbox, an RFID tag, or specialized communication mechanism.

RFID tags work by responding to incoming radio waves from the scanner or the transmitter. There is just enough energy in those radio waves to activate the RFID chip. They uniquely identify the article to which they have been attached to and the radio signal that zaps from the article to the receiver contains a digitally encoded identifier. They beam radio waves in the back of the book, receive the radio signal back from the book, and decode this to figure out a digital code that uniquely identifies the book you want to check out. In addition, RFID tags tend to work at much shorter distances compared to that of RF tags.

The marsupial robots or the truck weighs the packages before dropping it on the truck. The number of packages, weight, volume, and/or type is used as part of an accounting system to charge the customer for the service.

Figure 1:
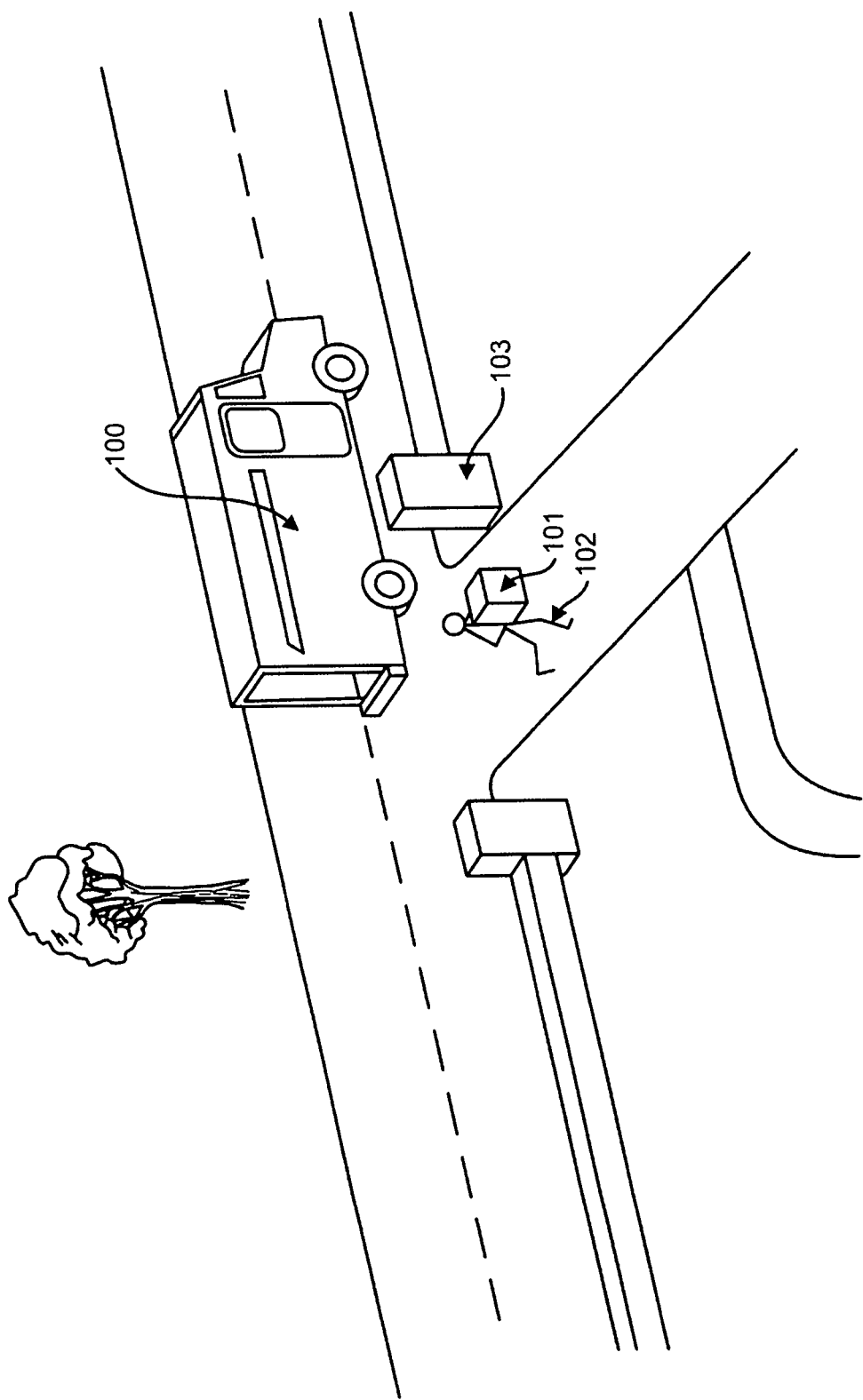
FIG. 1—The autonomous truck stops in locations that minimize time for the human to deliver and/or pickup items. Sensors detect worker locations and progress. Sensors detect desirable stopping locations and driving obstacles.

FIG. 1 shows an autonomous package delivery vehicle stopping in locations that minimize time for the human to deliver and/or pickup items. Sensors are used to detect the worker locations and progress. The sensors also detect desirable stopping locations and driving obstacles. In the figure it can be seen that there is a package delivery truck (100), the presence of obstacles (103) near the truck, and it shows a human delivery person (102) carrying the package (101) going toward a particular residence for the purpose of delivering the package.

Figure 2:
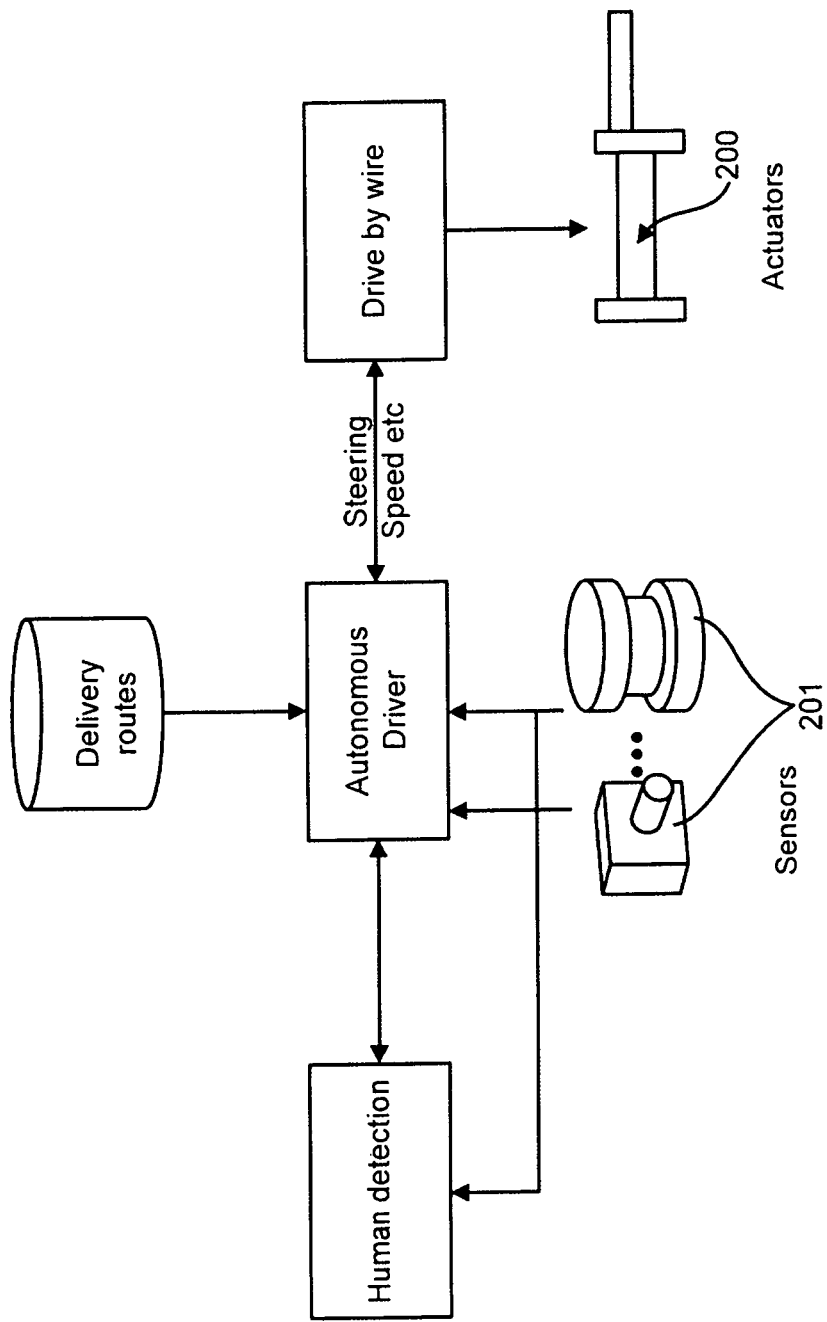
FIG. 2—The overall basic system for the package delivery truck.

FIG. 2 illustrates the overall basic system used for the autonomous package delivery truck. Here it can be seen that there is a drive-by-wire that goes toward actuators (200). The drive-by-wire controls the steering speed and other parameters for the autonomous driver which are connected to sensors and have certain delivery routes stored a-priori and leads to human detection.

Figure 3:
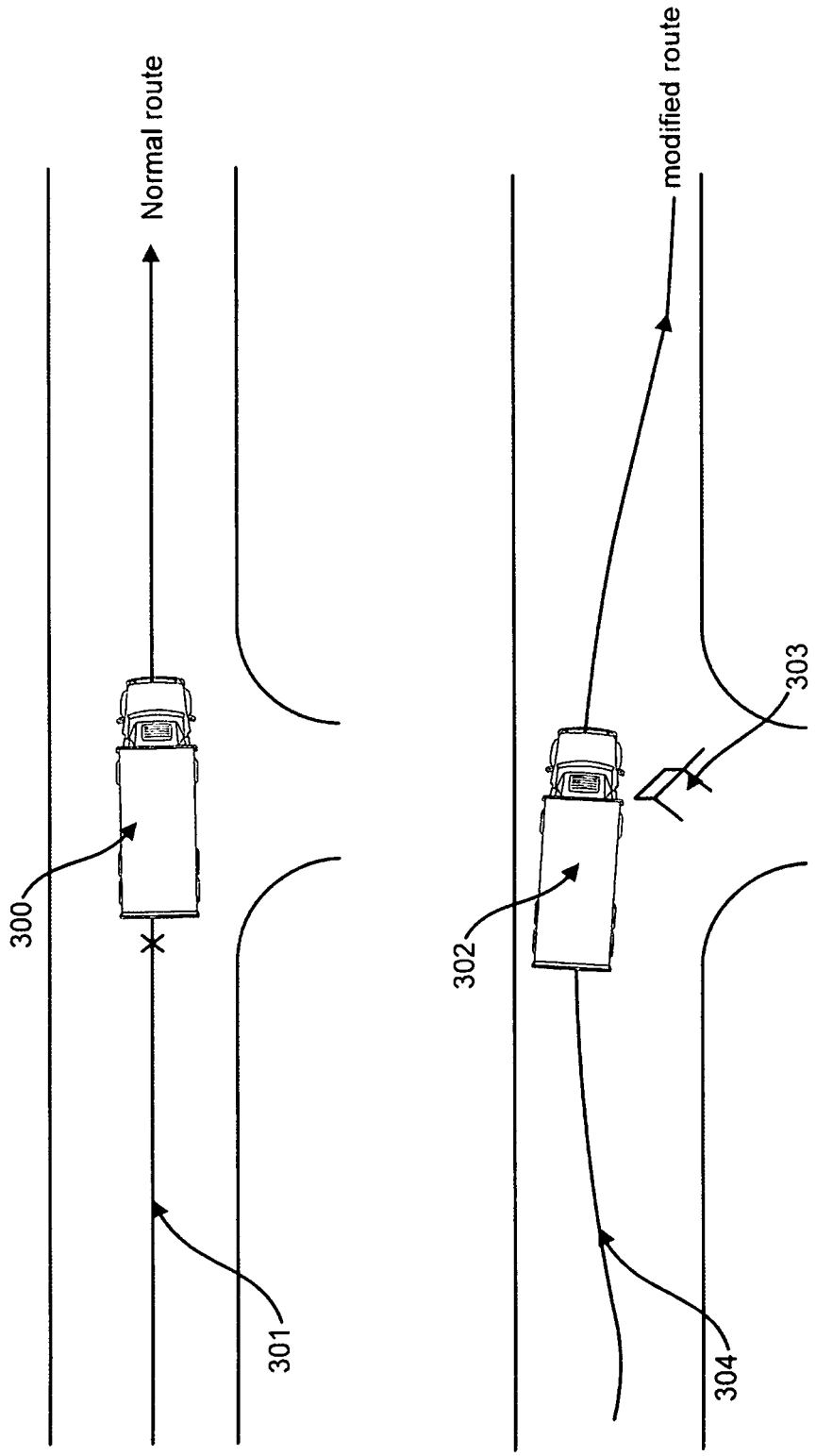
FIG. 3—If an obstacle is blocking the normal route, the vehicle will stop to avoid hitting the obstacle and require human assistance to pass the obstacle. On other variations, the vehicle will modify the route to continue without human assistance. The human assistance may be at a remote location commanding the vehicle using a radio communication system.

In FIG. 3, the autonomous package delivery truck (300, 302) following the normal route (301) as well as the modified route (304) is shown. The normal route (301) is used by the autonomous package delivery truck (300) when there are no obstacles present. The modified rout (304) is used by the autonomous package delivery truck (302) when there are obstacles (303) present. If an obstacle (303) is blocking the path of the autonomous package delivery truck (302) as can be seen in the bottom of FIG. 3, the autonomous package delivery truck (302) will stop to avoid hitting the obstacle (303) and require human assistance to pass the obstacle (303). On other variations, the autonomous package delivery truck (302) will modify the route (304) to continue without human assistance. In yet another variation, the human assistance may be at a remote location commanding the vehicle using a radio communication system.

Figure 4A:
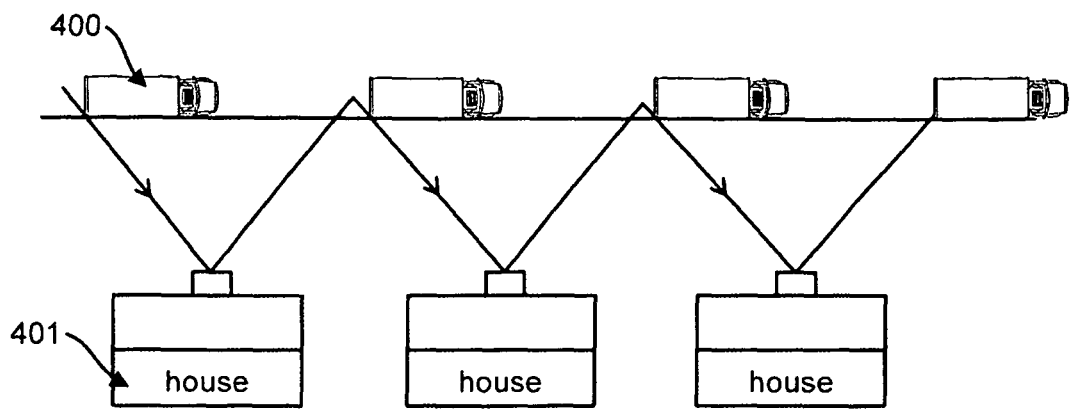
FIG. 4A—Stopping locations are computed to minimize the time to deliver the items. This considers where the human can and cannot walk due to obstructions, etc.
Figure 4B:
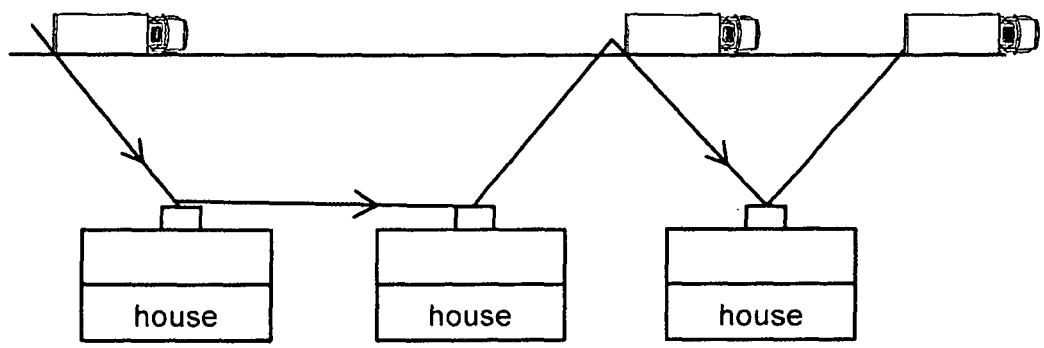
FIG. 4B—The human may be able to carry multiple deliveries without returning to the truck. If the packages are heavy, the walking time with the package may be slower than without it.
Figure 4C:
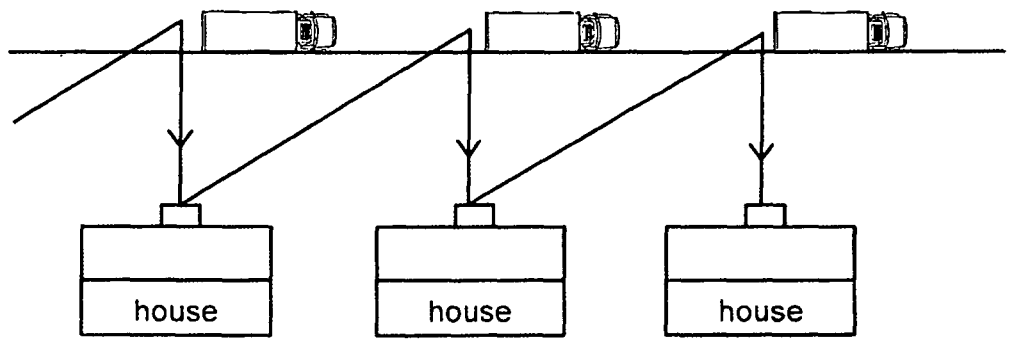
FIG. 4C—The stopping location can be adjusted to shorten the path while carrying the heavy load.

FIG. 4 shows several autonomous package delivery trucks (400) making deliveries to different houses (401). In FIG. 4A, the stopping locations are computed to minimize the time to deliver the items and this takes into consideration where the human can and cannot walk due to the presence of obstructions and obstacles. FIG. 4B shows that it can be possible for the human delivery person to carry multiple deliveries without returning to the truck. In the figure, it can be seen that packages are delivered to both the first and second house before returning to the autonomous package delivery vehicle for delivering the package to the third house. FIG. 4C shows that in the case of where the packages are heavy, the walking time with the package could be slower than without it. The stopping location can be adjusted to shorten the path while carrying the heavy load. In the figure it can be seen that the path to reach the residence is shortened to reduce the walking time with the heavy package.

FIG. 5 shows three different scenarios in which the autonomous package delivery truck (500) can vary its speed depending on if the human helper (501) is walking around the delivery truck as shown in FIG. 5A, riding on the delivery truck as shown in FIG. 5B, or riding inside the cab (502) as shown in FIG. 5C.

FIG. 6 shows three different scenarios such as without the presence of obstacles, with the presence of other obstacles and parked cars. FIG. 6A illustrates an autonomous package delivery truck (600) following a normal path (601) for delivering the package to the house (602). Without the presence of obstacles, the truck stops near the curb and near the delivery location to minimize the time to carry the package to the drop-off location. FIG. 6B illustrates an autonomous package delivery truck (603) following a modified path (604) in the presence of parked cars (605) and other obstacles in the path. Basically, the presence of parked cars and other obstacles can result in modified paths that are used for delivering the packages to the houses (606). FIG. 6C illustrates the case where the presence of several parked cars (608) or obstacles result in both a modified path (709) for the autonomous package delivery truck (608) and possibly a different stopping location for delivery of packages to the houses (610). Here, the presence of parked cars (608) and other obstacles result in modified paths (609) and/or stopping locations.

FIG. 7 illustrate the autonomous package delivery truck (700) in which the human helper (701) either presses a switch (702) to communicate commands or another human helper (703) issues verbal commands. Here, the autonomous package delivery truck can monitor the human workers (701, 703) to determine when they are finished unloading items and the truck can move to the next stop location. The humans (701, 703) may also signal the truck by pressing a switch, using hand signals, giving voice commands, or some combination of the two. These commands could be for the autonomous package delivery truck (700) to go, or for the autonomous package delivery truck (700) to wait.

FIG. 8 illustrates how small robotic systems (801, 802) can replace the humans in the autonomous package truck (800) delivery process and deliver the items to the drop-off location. Special docking devices may be employed to load packages and or recover the small robots.

The embodiments of the invention in which an exclusive property or privilege is claimed are defined as follows:

1. An autonomous delivery truck configured to follow a route to deliver a package in coordination with a human that walks to a package reception container/location comprising:
   a drive by wire kit coupled to control a speed and a direction of the autonomous delivery truck;
   a database storing information defining the route;
   a first sensor coupled to detect a position of the human; and
   a control mechanism in communication with each of the drive by wire kit, the database, and the sensor, wherein the control mechanism executes stored instructions that result in:
     identifying a first package delivery location;
     navigating, utilizing the information defining the route, to the first package delivery location;
     signaling the human to depart at the first package delivery location;
     tracking, utilizing the first sensor, the location of the human;
     identifying, based on the tracking, a pickup location for the human;
     navigating to the pickup location; and
     signaling the human to board the autonomous delivery truck at the pickup location.

2. The autonomous delivery truck of claim 1, wherein the first package delivery location is computed by the control mechanism based on a weight of a package to be delivered by the human at the first package delivery location.

3. The autonomous delivery truck of claim 1, further comprising:
   a second sensor coupled to detect an obstacle along the route.

4. The autonomous delivery truck of claim 3, wherein the execution of the stored instructions by the control mechanism, further results in:
   identifying, utilizing the second sensor, the obstacle along the route; and
   navigating around the obstacle.

5. The autonomous delivery truck of claim 1, wherein the execution of the stored instructions by the control mechanism, further results in:
   identifying a package pickup location;
   navigating, utilizing the information defining the route, to the package pickup location;
   weighing a package picked up by the human at the package pickup location; and
   computing a fee for the package based on the weighing of the package.

6. The autonomous delivery truck of claim 5, wherein the identifying a package pickup location, comprises:
   detecting, utilizing data captured from the package pickup location, an indication that the package is available for pickup.

7. The autonomous delivery truck of claim 6, wherein the detecting comprises identifying, from an image of the package pickup location, a physical indicia of the package being available for pickup.

8. The autonomous delivery truck of claim 6, wherein the detecting comprises receiving, from the package pickup location, a wireless signal indicia of the package being available for pickup.

9. The autonomous delivery truck of claim 1, wherein the first package delivery location comprises a first address in a cluster of consecutive addresses and wherein the pickup location comprises a last address in the cluster of consecutive addresses.

* * * * *